United States Patent [19]

Coleman

[11] Patent Number: 5,786,995
[45] Date of Patent: Jul. 28, 1998

[54] AVIONICS SYSTEM HAVING ACCESS THROUGH HINGED DISPLAY AND CONTROL PANEL

[75] Inventor: Larry Wayne Coleman, Los Angeles, Calif.

[73] Assignee: Teledyne Industries, Inc., Los Angeles, Calif.

[21] Appl. No.: 748,767

[22] Filed: Nov. 14, 1996

[51] Int. Cl.⁶ ................................................ G05B 00/00
[52] U.S. Cl. ........................................................ 364/188
[58] Field of Search ............................ 364/188; 361/681; 340/971; 313/478; 348/144; 434/55

[56] References Cited

U.S. PATENT DOCUMENTS

| 1,848,837 | 3/1932 | Powers. | |
|---|---|---|---|
| 2,130,250 | 9/1938 | Reed | 175/298 |
| 2,185,562 | 1/1940 | Nielsen | 250/16 |
| 2,566,064 | 8/1951 | Keim | 312/323 |
| 3,273,836 | 9/1966 | Hallerberg | 248/27 |
| 3,337,076 | 8/1967 | Ast | 220/3.6 |
| 4,532,513 | 7/1985 | Halvorson | 340/971 |
| 5,032,951 | 7/1991 | Schropp et al. | 361/391 |
| 5,307,238 | 4/1994 | Marcus | 361/681 |
| 5,351,176 | 9/1994 | Smith et al. | 361/681 |
| 5,430,612 | 7/1995 | Simon et al. | 361/752 |
| 5,446,339 | 8/1995 | Kinoshita et al. | 313/478 |
| 5,482,232 | 1/1996 | Wynn et al. | 248/27.1 |
| 5,507,647 | 4/1996 | Morris | 434/55 |
| 5,526,212 | 6/1996 | Drouin | 360/137 |
| 5,574,497 | 11/1996 | Henderson et al. | 348/144 |
| 5,579,057 | 11/1996 | Banker et al. | 348/589 |
| 5,583,795 | 12/1996 | Smyth | 364/516.44 |

OTHER PUBLICATIONS

High Speed Data Loaders; Airborne Data Loader, Portable Data Loader; Teledyne Controls.

Primary Examiner—Reba I. Elmore
Assistant Examiner—Monica Lewis
Attorney, Agent, or Firm—Knobbe, Martens, Olson & Bear, LLP

[57] ABSTRACT

An avionics unit is configured to be mounted in an aircraft cockpit for recording and displaying aircraft information. Front panel space is conserved on the avionics unit. The avionics unit includes a housing having an interior. At least one connector is located within the housing. The connector is configured to receive at least one removable storage cartridge. The avionics unit also includes an active front panel assembly having at least one display and at least one control. The active front panel assembly is swingably mounted to the housing, permitting the active front panel assembly to be selectively opened, to expose the housing interior for removal of the storage cartridge, and selectively closed, to enclose the storage cartridge within the housing interior.

20 Claims, 5 Drawing Sheets

AVIONICS SYSTEM HAVING ACCESS THROUGH HINGED DISPLAY AND CONTROL PANEL

BACKGROUND OF THE INVENTION

1. Field of the Invention

The present invention relates to an electronic avionics system. In particular, the present invention relates to an access door for an electronic avionics system.

2. Description of the Related Art

All modern aircraft, including helicopters and airplanes, incorporate electronic avionics systems in the aircraft cockpit. The electronic avionics systems perform a variety of important functions, including instrumentation, communications, and flight control. However, due to the very limited availability of air crew-accessible panel space, many desirable avionics system functions requiring pilot or air crew access cannot be accommodated. Thus, many attempts have been made to conserve front panel space so additional functions may be incorporated into the cockpit.

Many avionics systems have active front panels, including displays and switches. The displays are typically employed to present graphic or alphanumeric data to the pilot, including instrumentation information, navigational information and communication information. The displays may use light emitting diode (LED) technology, liquid crystal display (LCD) technology, or cathode ray tube (CRT) technology.

The switches incorporated on the front panels of many avionics systems may be used by the pilot to initiate a variety of actions by the avionics system.

In addition, electronic avionics systems often include non-volatile memory. The non-volatile memory may be in the form of semiconductor memory, magnetic media, or optical media. The non-volatile memory may be used for storing one or more types of information, including aircraft instrumentation data, self-test results, and control instructions.

It is often necessary to extract data stored in avionics systems which have non-volatile memories. Data is typically extracted from an avionics system's memory using one of several methods. One method uses removable memory cartridges. When memory cartridges are used to store data, the cartridges are concealed behind a front panel access door. The access door provides access to the memory cartridges by a ground crew service person without requiring the removal of the entire avionics system, while protecting the memory cartridge from dust and electromagnetic interference when the door is closed. This approach provides an easy and low cost method of retrieving data from the avionics system. However, this approach disadvantageously requires any display associated with the avionics system to be fixedly located on another portion of the front panel. Thus, a system requiring both a display and a cartridge access door requires a large front panel, which occupies a corresponding large area of the cockpit's air crew accessible panel space.

An alternative method for retrieving data from an avionics system includes a communication port connector. A ground crew service person connects an umbilical cord between the communication port connector (typically located on the front panel) and a portable computer or the like. The portable computer downloads the data onto storage medium, such as a floppy disk. The portable computer is either an expensive rugged version, capable of withstanding harsh handling, or is a commercial portable computer which is often dropped and damaged, requiring frequent repairs. Thus, while this approach uses little front panel area as compared to the approach described above, which requires a front panel access door, this approach is cumbersome and requires expensive support equipment.

As a further alternative, the avionics system is removed from the aircraft while on the ground to access the cartridge from the side or back of the system. This approach, however, requires the complete removal of the avionics system to gain access to the cartridge. Additionally, once the avionics system is removed from the aircraft, the system must be sent to a service depot to have the cartridge removed. Furthermore, the avionics system is often dropped or otherwise damaged by the ground crew service person during extraction from the aircraft or during transportation to the service depot. Additionally, since the avionics system cannot be used in the aircraft while the system is at the service depot, a spare system is required to take the place of the system being serviced. Thus, this technique is both time consuming, expensive, and frequently results in a damaged avionics system.

As described above, when an electronic avionics system includes both a display and removable cartridges, a large front panel is required to support the display and the front panel door which provides access to the removable cartridges. However, available front panel area is extremely limited in the cockpit environment. Thus, if the avionics unit includes a display, removable cartridges are typically not employed, due to the lack of available space for an access door. Instead, the cumbersome and expensive aforementioned methods—using a portable computer to download data onto a storage medium, or removing the entire avionics system from the aircraft—are used.

SUMMARY OF THE INVENTION

The present system provides an apparatus and method for a combined active panel and access door in an avionics system. The present invention advantageously provides access to removable memory media located within the avionics system via the combined active panel/access door. The present invention thereby eliminates the need for a first front panel area dedicated to active front panel features, such as displays and switches, and a second front panel area dedicated to a door providing access to the removable media. Thus, the present invention conserves scarce cockpit panel space by using the same panel space for both displays, controls, and cartridge access.

In accordance with one aspect of the present invention, an avionics unit is provided which is configured to be mounted in an aircraft cockpit for recording and displaying aircraft information. The avionics system includes a housing having an interior. At least one connector is located within the housing. The connector is configured to receive at least one removable storage cartridge. An active front panel assembly having an inward facing side and an outward facing side is provided. The active front panel assembly includes at least one display and at least one control on the outward facing side. The active front panel assembly is swingably mounted to the housing so that the active front panel assembly may be selectively opened, thereby exposing the housing interior for removal of the removable storage cartridge. The active front panel assembly may also be selectively closed, thereby enclosing the removable storage cartridge within the interior.

DETAILED DESCRIPTION OF THE PREFERRED EMBODIMENT

Figure 1A:
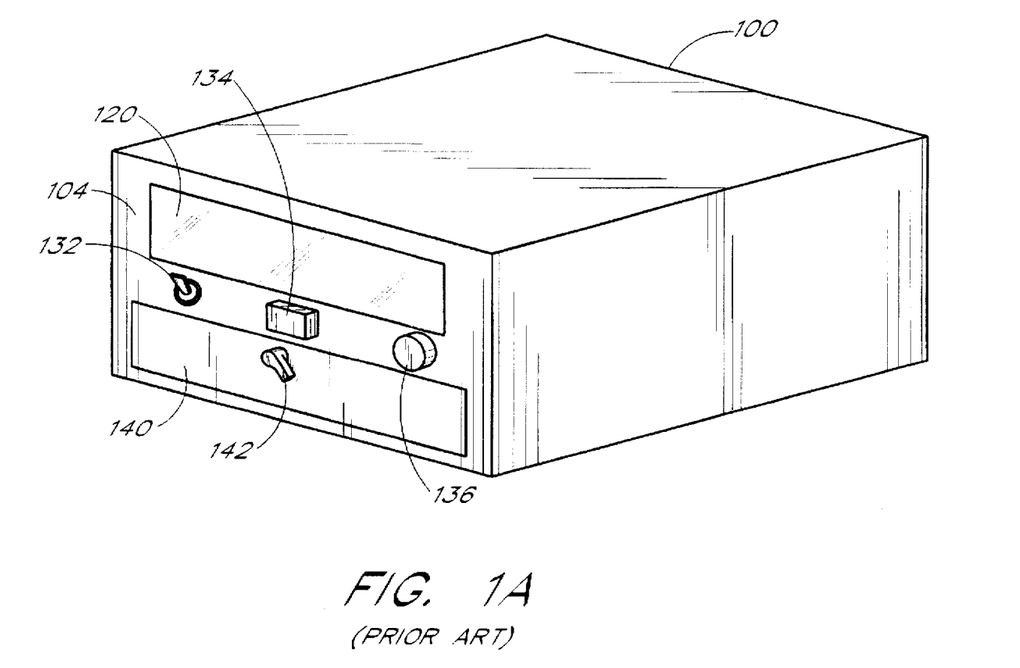
FIG. 1A is a perspective drawing of a prior art avionics systems configured to receive a removable data cartridge.

FIG. 1A illustrates a prior art cockpit-mounted avionics system 100 configured to receive a removable data cartridge. The system 100 includes a display 120 on a first portion of the avionics system front panel 104. The display is configured to present information, such as aircraft status, to a member of the flight crew or any other operator. The prior art avionics system further includes one or more toggle switches 132, illuminated push-buttons 134, and rotatory switches 136 on a second portion of the front panel 104, which allow the operator to initiate action on the part of the avionics system 100.

The prior art cockpit-mounted avionics system 100 includes an access door 140 on a third portion of the front panel 104, behind which is the removable data cartridge. The access door 140 protects the data cartridge from dust and other environmental hazards. The access door 140 includes a latch 142 to secure the access door in the closed position.

The front panel 104 must be large enough to accommodate the display 120, the switches 132, 134, 136, and the access door 140. If the cockpit does not have sufficient panel space available to accommodate the front panel 104, then prior art avionics systems typically dispense with the removable storage cartridge and the associated access door 140, thus reducing the size of the front panel 104. Data extraction is then performed by one of two methods. One alternative method for retrieving data from the avionics system includes a communication port connector mounted on the front panel 104 which must be connected to an external system for retrieving the data. However, the port connector takes up scarce front panel space. In a second alternative method, the avionics system must be completely withdrawn from the aircraft and a side or rear panel is removed to access the data cartridge.

Figure 1B:
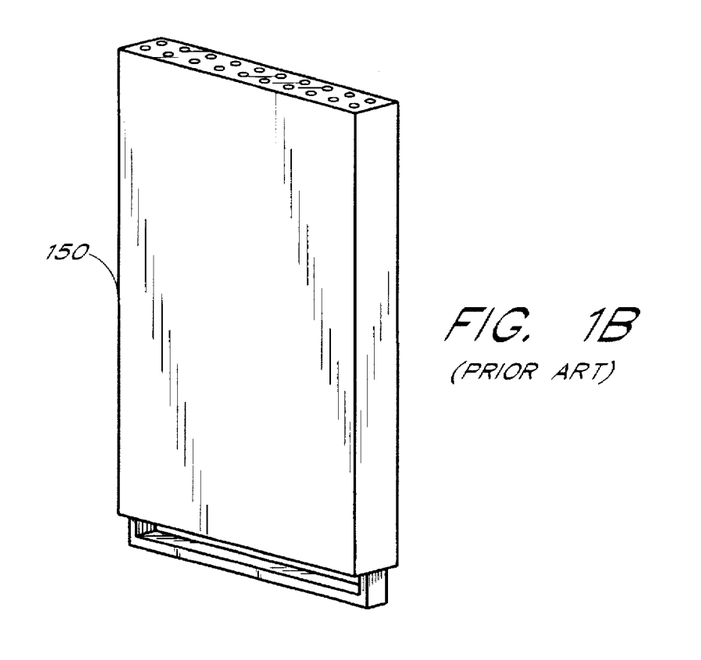
FIG. 1B is a perspective drawing of a prior art removable data cartridge.

FIG. 1B illustrates a prior art data cartridge 150. Prior art data cartridges are typically custom configurations, with physical dimensions and electrical interfaces varying from manufacturer to manufacturer. Therefore, the avionics system user must purchase data cartridges from the avionics system manufacturer. Thus, the lack of standardization often results in higher data cartridge prices and limited availability as compared to standardized data cartridges available from numerous manufacturers. Furthermore, the custom cartridges are typically not updated with new technology nearly as frequently as standardized cartridges. Therefore, the custom cartridges tend to be both physically larger and have fewer memory storage locations as compared to a standardized data cartridge.

Figure 2:
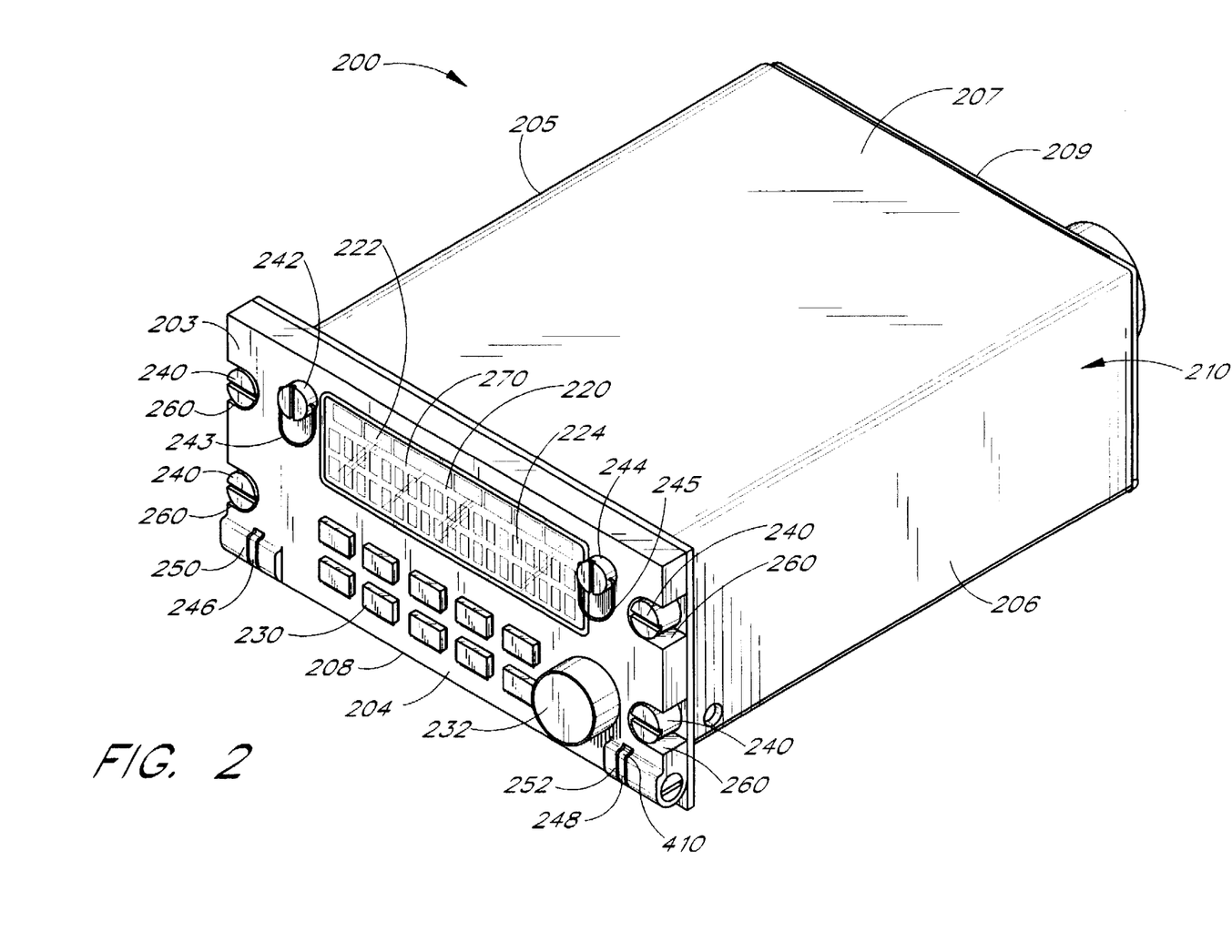
FIG. 2 is a perspective drawing of one embodiment of the avionics system with the active access door secured in the closed position.

FIG. 2 illustrates an electronic system 200 which incorporates a preferred embodiment of a uniquely configured front panel 204 that supports active elements, such as displays and switches, and acts as a cartridge access door. Thus, the present invention conserves front panel space by eliminating the need for a separate active portion of the front panel 204 and a separate access door.

In the illustrated embodiment, the electronic system 200 is an avionics system intended for mounting in an aircraft cockpit. Those skilled in the art, however, will readily appreciate that the present invention can be applied to automobile electronic systems, watercraft electronic systems, or to any other environment where panel space is limited. Furthermore, while the preferred embodiment is an avionics system for gathering and storing aircraft status and usage information, the present invention can be applied to systems which perform other functions as well.

In the illustrated embodiment, the avionics system 200 has a generally rectangular housing 210 and a front panel 204. As described below, in the preferred embodiment, the housing 210 includes electronics and a receptacle for a data storage cartridge. The housing 210 has a left side wall 205, a right side wall 206, a top 207, a bottom 208 and a rear end wall 209. The front panel 204 includes a bezel 203. In one embodiment, the front panel bezel 203 is approximately 5.74" wide, 2.625" high, and 0.312" deep. The housing is approximately 5.00" wide, 2.50" high, and 6.50" deep. The shape or size of the front panel 204 and the housing 210, however, are not critical to the present invention, and the avionics system may be adapted to fit a variety of mounting dimensions. In the preferred embodiment, both the housing 210 and the front panel bezel 203 are anodized aluminum.

The front panel 204 includes a display 220. In the preferred embodiment, a portion 224 of the display utilizes dot matrix light emitting diode (LED) technology to overcome both cockpit space constraints and the harsh cockpit visual environment. Furthermore, a polarized neutral lens 270 is disposed over the display 220. The lens 270 acts as an optical filter, reduces reflections, and enhances contrast, thereby improving the display 204 readability in direct sunlight. Aircraft cockpits, with their transparent canopies, often allow in a great deal of sunlight and the resulting glare can make displays difficult to read. Thus, aircraft displays typically uses light emitting diode (LED) technology, or cathode ray tube (CRT) technology, whose properties, when combined with an optical filter, permit them to have high contrast ratios, thus ensuring the displays are readable even in bright sunlight. LED display technology is preferred in applications where space constraints do not allow the use of CRTs, which are larger than LEDs. However, other embodiments of the present invention may use alternative display technologies, including liquid crystal diode technology.

LED dot matrix displays can radiate a significant amount of electromagnetic radiation. Therefore, the lens 270 in the preferred embodiment further includes a conductive coating. The conductive coating is in contact with the front panel bezel, thus acting as an electromagnetic shield, attenuating both incoming and outgoing electromagnetic radiation. In another embodiment, a conductive grid or other shielding structures may be used in place of the conductive coating.

The dot matrix display portion 224 consists of two rows of dot matrix character displays. Each row consists of twenty character displays, and each character display includes 35 pixels in a 5×7 LED dot matrix. Each display is capable of displaying at least a portion of the ASCII character set. In the preferred embodiment, the dot matrix display portion 224 displays data as commanded by a computer, as described below.

In the preferred embodiment, the display 224 further includes an annunciator portion 222. The annunciator portion 222 includes eight lighted-legend indicators. The legend indicators are each lit by a corresponding LED. In the preferred embodiment, the annunciator portion 222 provides status information to the operator.

The preferred embodiment of the present invention advantageously includes ten lighted push-buttons 230 mounted on the front panel 204. The push-buttons 230 permit the operator to select various modes of operation for the avionics system 200. Similarly, in the preferred embodiment, the front panel 204 has a push/turn vernier knob 232. Pushing the knob 232 in causes one embodiment of the avionics system 200 to gather data. Rotating the knob 232 scrolls the data displayed in the dot matrix display portion 224 up or down.

Figure 3:
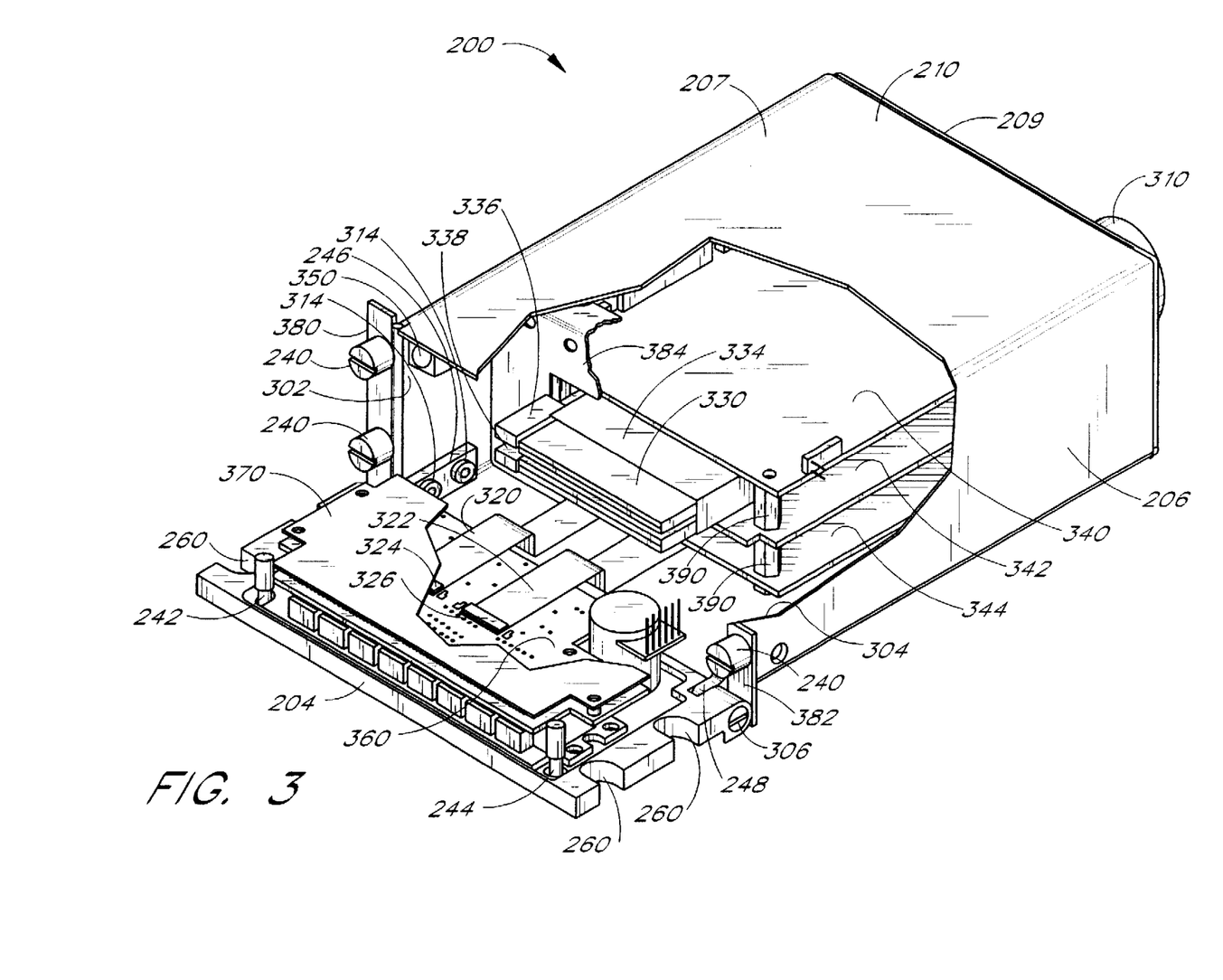
FIG. 3 is a cut-away perspective drawing of one embodiment of the avionics system with the active access door in the open position.

In the preferred embodiment, the front panel 204 is pivotally connected to the housing 210 by two center hinge leafs 246, 248 disposed in corresponding frame leafs formed by front panel hinge slots 250, 252 respectively. The hinges thus formed permit the front panel 204 to be swung open, as illustrated in FIG. 3, or closed, as illustrated in FIG. 2. Thus, the front panel advantageously acts as a door which provides access to the housing interior by a service person so that a data cartridge may be inserted or removed, as described below. In another embodiment, the front panel 204 may be slid off the housing 210, rather than being pivotally connected to the housing 210. As will be apparent to one skilled in the art, numerous different mechanisms may be used to mount the front panel 204 to the housing 210, thereby allowing the front panel 204 to be easily moved (by opening the panel 204 or removing the panel 204) so that access is provided to the housing interior.

Two quarter-turn fasteners 242, 244 are used in the preferred embodiment to secure the front panel 204 to the housing 210 in the closed position. Quarter-turn fasteners are well known in the art. The fasteners 242, 244 only have to be turned a quarter turn in the counter-clockwise direction to release the front panel 204. Similarly, the fasteners 242, 244 only have to be turned a quarter turn in the clockwise direction to secure the front panel 204 to the housing 210. Thus, the front panel may be quickly released or secured. The fasteners 242, 244 include corresponding buckle-shaped grips 243, 245 which are advantageously sized so that they may be turned by a service person using only fingers rather than requiring special tools. Other embodiments may employ different fastening techniques, including, by way of example, one or more latches.

Additionally, in the preferred embodiment, the front panel 204 protects the cartridge and other circuitry located within the housing interior from electromagnetic radiation emitted by other systems. Furthermore, the front panel 204 attenuates electromagnetic radiation emitted by the avionics system 200 or the data cartridge, thereby protecting other avionics systems.

Referring to FIG. 3, in the preferred embodiment, a left lip 380 of the housing 210 extends past the left side wall 205, and a right lip 382 extends past the right side wall 206 of the housing 210. Each lip 380, 382 has two rail mounting holes (not shown). Referring to FIG. 2, four fasteners 240 extending through corresponding lip mounting holes are used to mount the avionics system 200 to cockpit mounting rails (not shown). In the preferred embodiment, the fasteners 240 are dzus-type fasteners, though other fastener types can be used as well.

The front panel 204 has U-shaped cutouts 260 disposed about the heads of the fasteners 240. The U-shaped cutouts 260 are larger than the diameter of the heads of the fasteners 240 so that the front panel 204 may be opened or closed without removing the fasteners 240. While the preferred embodiment of the present invention is configured to be mounted to cockpit rails, those skilled in the art, however, will readily appreciate the avionics system 200 may be mounted in the cockpit using other mounting schemes.

The preferred embodiment of the avionics system 200 is illustrated in FIG. 3 with the front panel 204 in the open position. The left center hinge leaf 246 is affixed to an inward-facing surface 302 of the left side wall 205, and the right center hinge leaf 248 is affixed to an inward-facing surface 304 of the right side wall 206.

Figure 4:
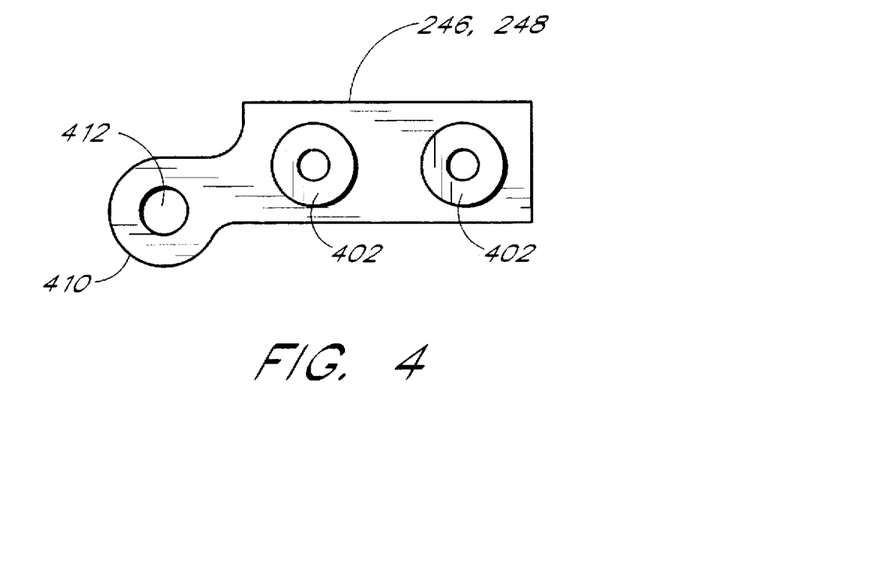
FIG. 4 illustrates one embodiment of a hinge leaf.

FIG. 4 is a detailed drawing of a preferred embodiment of the hinge leafs 246, 248. Each hinge leaf 246, 248 includes two mounting holes 402. In addition, each hinge leaf 246, 248 has a knuckle portion 410, which includes a pivot bore 412.

Referring to FIG. 3, the hinge leafs 246, 248 are secured to the respective inward-facing surfaces 302, 304 by screws 314 which extend through the hinge mounting holes 402 to threadingly engage the corresponding left and right side walls 205, 206. The knuckle portion 410 of each hinge is disposed in the corresponding front panel slot 250, 252. A first pivot pin 306 extends through a first side of the right slot 252, through the pivot bore 412 of the knuckle portion 410 of the right hinge leaf 248, and is threadingly engaged with a first receiving hole (not shown) on a second side of the right slot 252. A second pivot pin (not shown) extends through a first side of the left slot 250, through the pivot bore 412 of the knuckle portion 410 of the left hinge leaf 246, and is threadingly engaged with a second receiving hole (not shown) on a second side of the left slot 250.

As part of the front panel securing mechanism, the preferred embodiment of the housing 210 further includes a socket 350 configured to engage the fastener 242. A socket is similarly provided to engage the fastener 244. The fasteners 242, 244 advantageously cooperate with the corresponding sockets to secure the front panel 204 in the closed position even when subjected to high levels of vibration, such as is found in aircraft, and in particular, in helicopters.

In order to ensure that the front panel 204 is not damaged when opened, the hinge leafs 246, 248 cooperate with the front panel 204 so the front panel 204 is constrained to open at no greater than approximately a 90° angle relative to the housing 210. Thus, the front panel 204 will not swing all the way down, advantageously reducing the risk of the lens 270 striking the face of a unit mounted below the system 200 in the cockpit.

In the preferred embodiment, a display circuit board 360 is positioned on an inward-facing surface 314 of the front panel 204. Mounted on the circuit board 360 are the dot matrix displays and the lighted-legend indicators. In addition, the pushbuttons 230 and push/turn vernier knob 232 are connected to the circuit board 360. It is desirable to substantially enclose the display circuit board with a shield 370. The shield 370 protects the display circuit board 360, as well as the displays, from debris, salt water, and other environmental hazards when the front panel 204 is in the open position. Furthermore, in the preferred embodiment, the shield is conductive and thus protects electronic components mounted on the display circuit board 360 from interference or damage which may result from electromagnetic radiation emitted by other systems. Additionally, the shield 370 attenuates electromagnetic radiation emitted by the circuit board 360 and associated electronics resulting from the operation of the display while the front panel 204 is in the open position.

In another embodiment a gasket (not shown) is disposed on either the inward-facing surface 314 of the front panel 204 or around the rim of the housing 210 opening. The gasket may provide an additional seal against the environment or against electromagnetic radiation, or both, when the front panel 204 is in the closed position.

In the preferred embodiment, one or more connectors 310 are provided on the rear end wall 209 of the avionics system 200. The connectors are used to provide electrical interfaces, for both power and communications, between the aircraft and the avionics system 200.

The preferred embodiment further includes an electronic assembly, including three printed circuit boards 340, 342, 344. The circuit boards 340, 342, 344 are positioned in the interior of the housing 210. In the preferred embodiment, the circuit board 340 includes the processing unit, associated memory, and support logic. The circuit board 342 includes a PCMCIA cartridge socket 334 and PCMCIA interface circuitry. The circuit board 344 includes interface logic used in communicating with and controlling the front panel 204. The circuit boards 340, 342, 344 form a stacked assembly, wherein each circuit board is supported by corresponding stand-offs 390. The circuit boards 340, 342, 344 cooperate to provide computational and command functions. Thus, the circuit boards 340, 342, 344 send display data to the dot matrix display portion 224 and control the illumination of each of lighted-legend portion 222 LEDs.

Figure 5:
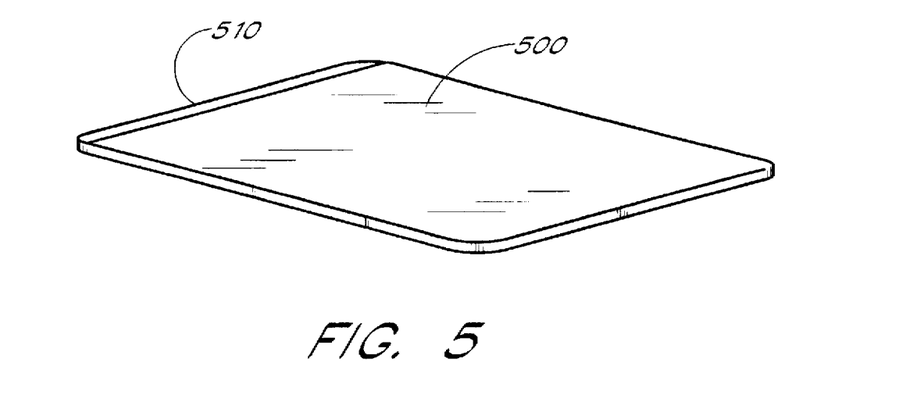
FIG. 5 illustrates one embodiment of a removable data cartridge.

In the preferred embodiment, the cartridge socket 334 is mounted to the circuit board 340. Preferably, the cartridge socket 334 is configured to receive PCMCIA cards (also known in the art as PC cards). PCMCIA is a well known industry standard for removable electronic cards, specifying both electrical and physical characteristics. However, other types of receptacles and removable cartridges may be used in other embodiments. The socket 334 includes two slots, each slot sized to receive a PCMCIA type II card 330, 332 or a PCMCIA type III card. A PCMCIA type II card 500 is illustrated in FIG. 5. A connector (not shown) is provided at one end of the socket 334 to mate with the PCMCIA card connector 510. In the preferred embodiment, each PCMCIA card includes non-volatile memory, including, by way of example, FLASH memory, EEPROM memory, battery-backed RAM, or magnetic memory. Alternatively, other functions may be incorporated into the PCMCIA cards in place of, or in addition to, the non-volatile memory. Thus, for example, the PCMCIA cards may include networking functions, communication functions, and cryptographic function.

A two color—red and green—status LED is optionally provided for each PCMCIA card slot, adjacent to the corresponding PCMCIA card slot. The avionics system electronics commands a status LED to illuminate "red" if no PCMCIA memory card is installed in the slot, or if the card is installed incorrectly, or if the card is non-functioning, or if all the memory card's storage locations are already utilized. The status LED is commanded to illuminate "green" if the PCMCIA card is installed correctly, there are unused memory locations, and data is being recorded correctly.

As illustrated in FIG. 3, the socket 334 preferably includes two ejectors 336, 338 corresponding to the two PCMCIA cards 330, 332. Pressing on an ejector causes the corresponding PCMCIA card to disengage from the socket connector and to be at least partially ejected from the socket 334. PCMCIA ejector mechanisms are well known in the art.

The use of removable storage cartridges, such as PCMCIA cards, allows data stored on the cartridges to be efficiently retrieved by opening the front panel 204 and ejecting the cartridges. No disassembly of the avionics system 200 is required. Once the cartridges have been removed, they may then be advantageously read at a more convenient site using low-cost equipment, such as a standard personal computer. In addition, as storage technology improves, the avionics system 200 may be upgraded by inserting new data cartridges incorporating the improved technology. Furthermore, the avionics system's operational programs may be stored on the removable cartridges. Thus, the avionics system may be reprogrammed by the expedient of inserting a data cartridge storing the new program.

Furthermore, the use of standardized cards, such as PCMCIA cards, allows the user to purchase the cards from a variety of manufactures. Thus, the user can take advantage of the competitive pricing found on such standardized cards, and be assured of card availability.

Figure 6:
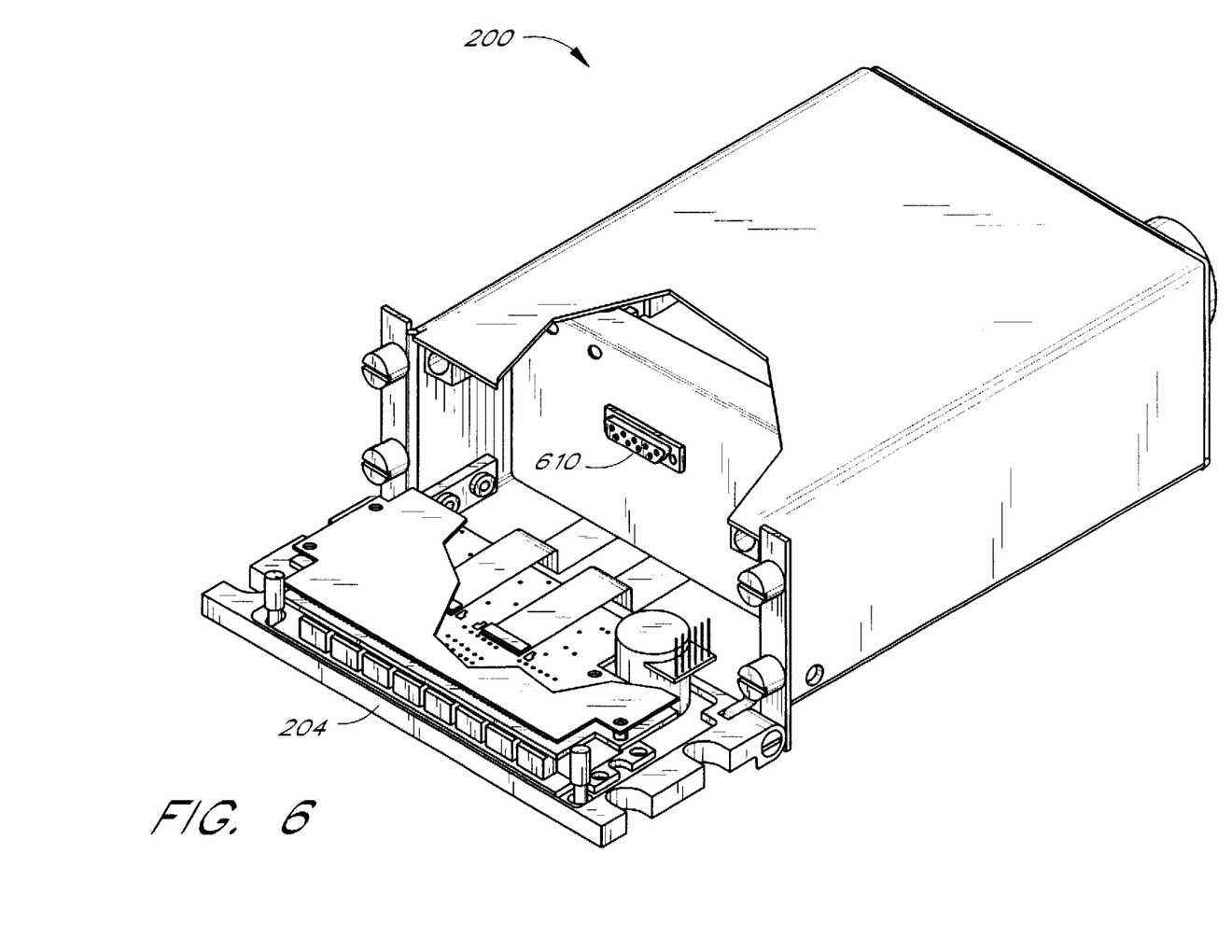
FIG. 6 is a cut-away perspective drawing of one embodiment of the avionics system with a port connector located within the system housing.

In another embodiment, illustrated in FIG. 6, a communication port 610 is used in place of, or in addition to, the removable cartridges as a means of retrieving data from the avionics system 200. The communication port 610 is advantageously located within the housing 210 and so does not use any front panel space. Furthermore, the front panel 204 protects the port 610 from dust and debris when the front panel 204 is in the closed position. Thus, data stored in memory, including non-removable memory, within the electronic system 200 may be retrieved by opening the front panel 204 and connecting an external system (not shown) for retrieving the data to the communication port 610 via a cable or the like.

It is desirable to have the circuit boards 340, 342, 344 protected by a shield 384. The shield 384 protects the electronics and circuit boards from environmental and electromagnetic hazards present when the front panel 204 is in the open position. It will be appreciated by one skilled in the art, that the shield 384 as illustrated in FIG. 3 is a cut-away representation, and that the shield 384 substantially covers the circuit boards 340, 342, 344 except for a slot sized to receive the data cartridges 330, 332.

In the preferred embodiment, the circuit boards 340, 342, 344 are interfaced to the display circuit board 360 via first and second flexible cables 320, 322. Other embodiments may utilize other interfacing techniques, including, but not limited to, fiber optic cables, individual wires, or rigid-flex cables. It is desirable that the cables 320, 322 be coupled to the display circuit board 360 via connectors 324, 326 for ease of assembly. Furthermore, the use of connectors allows the front panel 204 to be removed by the expedient of unscrewing the pins 306 and unplugging the cables 320, 322. Thus, a non-functioning front panel 204 may be replaced with a new front panel, without necessitating the removal of the entire avionics system 200. Similarly, the front panel 204 may be easily replaced with an upgraded front panel having, by way of example, brighter displays, lower powered displays or flat panel displays.

In an alternative embodiment, the avionics system computer and associated electronics may be located on the front panel 204. Thus, the computer may be upgraded by removing the front panel 204 as described above, and replacing it with a front panel 204 which includes a more advanced computer.

Although this invention has been described in terms of a certain preferred embodiment, other embodiments apparent to those of ordinary skill in the art are also within the scope of the invention. Accordingly, the scope of the invention is intended to be defined only by the claims which follow.

What is claimed is:

1. An avionics unit in which front panel space is conserved, said avionics unit configured to be mounted in an aircraft cockpit for recording and displaying aircraft information, said avionics unit comprising:

a housing, said housing having an interior;

a stacked assembly of at least two circuit cards located within said housing;

at least one receptacle mounted on at least one of said two circuit cards, said at least one receptacle configured to receive at least one removable storage cartridge;

an active front panel assembly having an inward facing side and an outward facing side, said active front panel assembly including at least one display and at least one control used to set a mode of said avionics unit on said outward facing side, said active front panel assembly swingably mounted to said housing, wherein said active front panel assembly is configured to be selectively opened, thereby exposing said housing interior for removal of said at least one removable storage cartridge, said active front panel assembly configured to be selectively closed, thereby enclosing said at least one removable storage cartridge within said interior; and a circuit board mounted on the inward facing side of said active panel, wherein said control is connected to said circuit board.

2. An avionics unit as defined in claim 1, wherein said front panel assembly includes at least one fastener having a buckle shaped grip, said at least one fastener configured to releasably secure said front panel assembly in a closed position.

3. An avionics unit as defined in claim 1, wherein said at least one fastener can be latched without the use of tools and said front panel assembly is coupled to said housing by at least one hinge having a portion disposed in a slot defined by said front panel.

4. An avionics unit as defined in claim 1, further comprising at least one mounting fastener, said at least one mounting fastener configured to mount said avionics unit to at least one cockpit rail.

5. An avionics unit as defined in claim 1, wherein said at least one removable storage cartridge is a PCMCIA cartridge.

6. An avionics unit as defined in claim 1, wherein said at least one display is a dot matrix LED display having at least one 5×7 LED array.

7. An avionics unit as defined in claim 1, further comprising at least one optical filter, said at least one optical filter disposed over at least a portion of said at least one display to enhance display contrast.

8. An avionics unit as defined in claim 7, wherein said at least one optical filter includes electromagnetic shielding.

9. An avionics unit as defined in claim 1, further comprising an EMI gasket disposed on said inward side of said front access door so that said EMI gasket is in contact with said housing when said active front panel assembly is in the closed position.

10. A housing for an electronic system, said housing comprising:

an enclosure having an interior;

at least one circuit board mounted in said housing, said circuit board supported by at least one stand-off;

at least one receptacle located within said enclosure, said at least one receptacle connected to said at least one circuit board and configured to receive at least one removable electronic module; and an active panel, including at least one operator-accessible switch used to set an operating mode of said electronic system, said active panel movably mounted to said housing, wherein said active panel is configured to be selectively opened, thereby exposing said interior for removal of said at least one removable electronic module, and wherein said active panel is configured to be selectively closed, thereby covering said enclosure interior and said at least one electronic module, said operator-accessible switch being accessible when said active panel is closed.

11. A housing as defined in claim 10, wherein said removable electronic module is a data storage cartridge.

12. An housing as defined in claim 11, wherein said electronic module is a PCMCIA device.

13. A housing as defined in claim 10, wherein said active panel includes at least one display.

14. A housing as defined in claim 13, wherein said display is an LED display including at least one array having at least 35 pixels capable of displaying at least a portion of the ASCII character set.

15. A housing as defined in claim 13, wherein said display is an CRT used to display status information.

16. A housing as defined in claim 13, wherein said display is an LCD display.

17. A housing as defined in claim 13, further comprising a polarized lens, said lens disposed over said at least one display.

18. A housing as defined in claim 10, wherein said active panel includes at least one vernier switch.

19. An aircraft status monitoring system, said aircraft status monitoring system configured to retain data when power is removed, said aircraft status monitoring system comprising:

a housing having an interior;

a circuit board located in said interior;

at least one socket located within said housing and mounted to said circuit board, said at least one socket configured to receive at least one removable non-volatile memory cartridge;

an access door, said access door movably mounted to said housing, wherein said access door is movable from an open position, thereby exposing said interior for removal of said at least one removable non-volatile memory, to a closed position, wherein said interior and said at least one non-volatile memory cartridge is covered;

an illuminated switch positioned on said access door: and at least one pixel display, said pixel display attached to said access door.

20. A housing for a first electronic system, said housing comprising:

an enclosure having an interior;

at least one port connector located within said enclosure, said at least one port connector configured to receive at least one removable cable connectable to a second electronic system for retrieving data stored within said first electronic system; and an active panel having either a display or a switch or both said display and said switch, said active panel movably mounted to said housing, wherein said active panel is configured to be selectively opened, thereby exposing said interior providing access to said port connector for connection to said removable cable, and wherein said active panel is configured to be selectively closed, thereby covering said enclosure interior and said port connector.

* * * * *

UNITED STATES PATENT AND TRADEMARK OFFICE
CERTIFICATE OF CORRECTION

PATENT NO. : 5,786,995
DATED : July 28, 1998
INVENTOR(S) : Larry Wayne Coleman

It is certified that error appears in the above-identified patent and that said Letters Patent is hereby corrected as shown below:

Column 10, Line 46, "door: and" should be --door; and--.

Signed and Sealed this

Sixteenth Day of February, 1999

Attest:

Attesting Officer

Acting Commissioner of Patents and Trademarks